Patented Dec. 10, 1935

2,023,536

UNITED STATES PATENT OFFICE 2,023,536

PROCESS OF DRYING FRUIT

Charles C. Moore, San Francisco, Calif., assignor to Vacuodri Fruit Corporation, a corporation of Delaware No Drawing. Application September 18, 1929, Serial No. 393,598. Renewed October 22, 1935

4 Claims. (Cl. 99—5)

This invention relates to the treatment of fruit for the purpose of bringing the fruit to a substantially-dry condition without material change in the chemical structure of the fruit sugars contained therein. The term "substantially-dry", as used in this specification and the appended claims, is understood to imply that the moisture content is so reduced that further treatment results in no practical reduction. It is generally known to chemists that materials high in sugar, such as dried fruits, resist the complete removal of moisture, whereupon it is customary to refer to the substance as being substantially dry even though it may contain moisture to the extent of about two percent. As is known to chemists, the principal sugar in most fruits is fructose; it generally constitutes about 80 percent of the total sugars in the fruit. And fructose is known to chemists as being sensitive to heat such that a temperature of 73-75 cent. inverts or changes it to a sugar of different chemical structure and physical properties, which changes are detrimental to the fruit as a food substance. In this specification and appended claims, the phrase "material change in the chemical structure of the fruit sugars" is understood to imply that the change, if any, is not sufficient to be noticed by a consumer of the fruit as a food substance. As the fructose sugar in a fruit undergoes inversion, the color and sweetness are lowered according to the extent of the inversion; the change may vary from inappreciable to complete or a very dark tasteless substance.

In the making of dried fruits, such as prunes, apricots, peaches, grapes, etc., the fresh fruit is dried either by exposure to the open air, or by uses of artificially heated currents of air; in the first instance known as "field drying", in the second instance as "dehydration". In this specification and the appended claims, it is understood that dehydration is used in the generic sense and intended to imply either method of drying.

In commercial practice, where the fruit is dried by artificially heated currents of air, the temperature is kept well below 75 cent. to avoid the inversion of the fructose sugar; and the moisture content is seldom reduced to as low as 15 percent, due to the retentive property the fruit sugars have for moisture. In practice, it is found that dehydrated fruit, as received from the grower, ranges from 15 to 25 percent moisture content. The dehydrated fruit, as received by the packer, is stored in bins prior to packing; and, while in the storage bins, is liable to insects, dust, etc., necessitating the fruit be washed immediately before packing, this final washing of the fruit being known as "processing". As generally known, after the fruit is processed, its moisture content is further increased until it is something like 33 percent of the fruit substance. Obviously, it is not consistent to apply the term "dried fruit" to a product that is one-third moisture; yet this processed fruit is commercially known as "dried fruit". The gain in moisture is, of course, advantageous to the packers who sell by tonnage, but there is the disadvantage of lowering the preserving or keeping qualities of the fruit; and this, in turn, results in the commercial practice of processing and packing the fruit only as required for immediate market demands.

If the fruit be reduced to substantial dryness, as packed, its preservation is greatly enhanced, the tonnage shipment is decidedly lowered, and the packing may be done at the convenience of the packers rather than, only, in accordance with market demands. And it is obvious that the market price of "dried fruit", one-third of which is water, should be only two-thirds the market price of substantially-dry fruit, not even considering the saving in freight on the water and the advantages of packing the fruit at convenient times for future deliveries.

My invention is an improved method of reducing the moisture content of dehydrated fruit, whether it be processed or not, to a condition of substantial dryness by treatment in vacuo with an improvement in the method of heating the fruit under treatment, and my procedure is to be now disclosed.

The dehydrated fruit is put in suitable containers, such as trays, boxes, etc., or it may be pressed into any suitable form, such as masses, cakes, etc.; it is then enclosed in a suitable chamber that is adaptable for either vacuum conditions or pressure conditions, there being suitable valves and pipe lines connecting with a vacuum pump and with a steam boiler or other suitable means for making a heating medium in aeriform state. There is a vacuum gauge and a pressure gauge, suitably placed, for noting the degree of either vacuum or pressure conditions in the chamber. With the fruit enclosed in the chamber, the vacuum line is opened to give a suitable gauge reading of vacuum, such as about 25 inches (mercury). The vacuum line is then closed and the steam line opened until a suitable pressure is revealed, such as 10 to 15 pounds, which pressure is maintained for a suitable period of time, such as two or three minutes, after which the steam line is closed, the pressure released by means of a suitable escape line, and the vacuum line opened, thereby lowering the temperature of the vapor in the fruit and the vapor emanating from it, due to the known laws of temperature of vapors varying with the pressure. While the steam in the chamber is under pressure, such as 15 pounds, the temperature is about 115 cent.; whereas, with the pressure released and the vacuum reading 20 inches, for instance, the temperature of the vapor in the fruit cannot exceed about 72 cent., but the fruit cannot partake of the temperature of the steam in the short time elapsing before the temperature of the vapor is lowered through the lowering of the pressure by means of the vacuum line being opened. While I have found that with lower pressure than 15 pounds, the time of application is lengthened accordingly, yet I find it good practice to apply a pressure of 15 pounds for two minutes, this being safe and sufficient, generally.

If hot air or a hot gas be used instead of steam as the heating medium in aeriform state, the operation is expedited; however, steam is advantageously obtained and controlled, therefore is preferable. It is understood that the phrase "heating medium in aeriform state", as used in this specification and appended claims, implies steam, air, gases and mixtures of these.

In the dried fruit industry, some of the fruits are cut in two or more pieces preparatory to dehydrating, such as apricots, peaches, apples, pears, etc., and are commonly known as cut fruits. Other fruits, such as prunes, grapes, etc., are not cut preparatory to dehydrating. These two classes of fruits are dehydrated in, practically, the same manner, though the preliminary treatment varies. As is to be expected, the cut-fruit class is more readily lowered in moisture content than is the other class; the whole fruit, such as prunes and grapes, being more resistant to a heating medium in aeriform state, and more resistant to vaporization of moisture through the enclosing cortex. To overcome this disadvantage in such fruits as prunes and grapes, I macerate the dehydrated prune (after removal of the pit), and the dehydrated grape, after removal of the stem. The macerated fruit is then pressed into any suitable form, such as masses, cakes, etc., and subjected to the steam treatment, etc., as above described for reducing a fruit to substantial dryness without material change in the fruit sugars. The resultant product is a porous mass or cake that is substantially crisp and dry, and may be crushed or ground to any more convenient form for ultimate use in the kitchen or household. It is obvious that any fruit, after being dehydrated, can be macerated and pressed into any suitable form, and then reduced to substantial dryness as above described. It is understood, in this specification and the appended claims, that the term "suitable form" implies the whole fruit, the half-fruit, or mere pieces of it, or any macerated or pressed form of either class of dried fruits.

From the above description it will be clear that I have devised a method for expediting the heating of the fruit, preparatory to subjecting it to the vacuum conditions for the purpose of reducing the fruit to a state of substantial dryness without material change in the chemical structure of the fruit sugars contained therein. The factor of pressure together with the factor of time through which the heating medium in aeriform state is applied may be varied in degree, and substitutions may be made without departing from the basic principles above described. It is understood, therefore, that my invention is not to be confined to the details disclosed but includes all departures therefrom falling within the terms of the appended claims.

What I claim is:

1. The process of reducing dehydrated fruit containing a considerable fructose sugar content to a substantially dry condition which comprises subjecting dehydrated fruit for a predetermined period of time to a pressure heating medium in aeriform state at a temperature considerably in excess of that at which fructose sugar inverts to heat the fruit to a temperature approximating the point of inversion, withdrawing the heating medium before the fruit has absorbed sufficient heat to cause inversion, and immediately thereafter so reducing the pressure of the surrounding medium as to suddenly vaporize a portion of the moisture in the fruit, and maintaining a reduced pressure until the moisture is substantially removed.

2. The process of reducing dehydrated fruit containing a considerable fructose sugar content to a substantially dry condition which comprises subjecting the dehydrated fruit for a pre-determined period of time to a pressure heating medium in aeriform state at a temperature in excess of 100° C. to heat the fruit to a temperature approximating the point of inversion, discontinuing the application of said heating medium before the fruit has absorbed sufficient heat to cause inversion, and immediately thereafter so reducing the pressure of the surrounding medium as to suddenly vaporize a portion of the moisture in the fruit, and maintaining a reduced pressure until the moisture is substantially removed.

3. The process of reducing dehydrated fruit containing a considerable fructose sugar content to a substantially dry condition which comprises subjecting dehydrated fruit for between two and three minutes to a pressure heating medium in aeriform state and at a temperature in excess of 100° C. to heat the fruit to a temperature approximating the point of inversion, withdrawing the heating medium before the fruit has absorbed sufficient heat to cause inversion, and immediately thereafter so reducing the pressure of the surrounding medium as to suddenly vaporize a portion of the moisture in the fruit, and maintaining a reduced pressure until the moisture is substantially removed.

4. The process of reducing dehydrated fruit containing a considerable fructose sugar content to a substantially dry condition which comprises subjecting dehydrated fruit for a pre-determined period of time to steam under a pressure of approximately 15 pounds to heat the fruit to a temperature approximating that at which fructose sugar inverts, discontinuing the application of steam before the fruit has absorbed sufficient heat to cause inversion, and immediately thereafter so reducing the pressure of the surrounding medium as to suddenly vaporize a portion of the moisture in the fruit, and maintaining a reduced pressure until the moisture is substantially removed.

CHARLES C. MOORE.